United States Patent [19]

Camloh et al.

[11] Patent Number: 4,890,371
[45] Date of Patent: Jan. 2, 1990

[54] PALLET CHANGER FOR MACHINING CENTER

[75] Inventors: William J. Camloh, Lafayette; Charles Alcott, Canastota, both of N.Y.

[73] Assignee: Camloh Industries, Inc., Tully, N.Y.

[21] Appl. No.: 116,956

[22] Filed: Nov. 5, 1987

[51] Int. Cl.⁴ .............................................. B23B 5/28
[52] U.S. Cl. ...................................... 29/33 P; 134/62; 134/133; 134/153; 134/200
[58] Field of Search ................ 134/62, 66, 133, 134, 134/57 R, 144, 153, 159, 200; 29/DIG. 50, DIG. 53, DIG. 94, 799, 33 P

[56] References Cited

U.S. PATENT DOCUMENTS

| | | | |
|---|---|---|---|
| 2,995,851 | 8/1961 | Dirats | 134/144 |
| 3,207,167 | 9/1965 | Edstrom | 134/144 |
| 3,465,761 | 9/1969 | Meeker et al. | 134/58 |
| 3,796,186 | 3/1974 | Bounds et al. | 118/603 |
| 4,693,370 | 9/1987 | Aceti | 206/488 |

FOREIGN PATENT DOCUMENTS

| | | | |
|---|---|---|---|
| 2705376 | 8/1978 | Fed. Rep. of Germany | 29/33 P |
| 0865417 | 4/1961 | United Kingdom | 29/33 P |

Primary Examiner—Eugene R. LaRoche
Assistant Examiner—Truc Nguyen
Attorney, Agent, or Firm—Wall and Roehrig

[57] ABSTRACT

A pallet changer device is associated with a milling or machining device and has a table that indexes 180°. A pallet is held in an upright position for loading of fresh workpieces, while machining is carried out automatically on workpieces on a similar pallet. When the machining is complete, the table indexes 180° exposing an available station, and an arm retrieves the pallet of machined parts and moves it onto the table. Then the table is indexed again, and the pallet of fresh workpieces is moved to a work station at the machining device. A wash cycle is carried out on the pallet of workpieces, now suspended beneath the inverted table. After the cycle, the table is inverted placing the cleaned finished workpieces upright. These are removed from the pallet and replaced with fresh workpieces.

11 Claims, 7 Drawing Sheets

PALLET CHANGER FOR MACHINING CENTER

BACKGROUND OF THE INVENTION

This invention relates to milling or machining apparatus, and auxiliary equipment therefor, and is more specifically directed to a device that handles pallets on which are mounted workpieces that are to be positioned at a work station adjacent the milling or machining apparatus.

The invention is more particularly concerned with a device in which raw workpieces can be mounted on an upper surface of a pallet on the device, after which the device automatically positions the pallet and its workpiece or workpieces at the milling or machining work station, and brings out from the work station a similar pallet containing parts which have been suitably machined by an earlier operation. The latter pallet is brought to a cleaning or working station within the device where metal chips and other milling debris are washed and/or blown from the finished parts and from the pallet, after which the pallet is positioned so that an operator can remove the finished parts and replace them with fresh, unmachined workpieces.

It is the current practice for an operator to position workpieces by hand at a milling machine, or if a pallet is employed for carrying the workpieces, to position the pallet by hand at a work station beneath the head of the milling machine tool.

An automatic set-up system for providing palletized work to be machined by an automatic machine tool has been proposed in U.S. Pat. No. 4,543,970. In that system the pallet is conveyed to the machining device, and the pallet and work that is clamped to it are fed into a cleaner where debris and chips are washed from the pallet and the machined parts. This system is rather complex and elaborate and is not readily field installable or retrofittable onto existing machining equipment. The system cannot be made compactly enough to be positioned alongside a milling center or the like. Also, the setting table and cleaner are in separate units, and an elaborate conveyer system is required to carry the pallets among its various stations. In addition, no effort has been made to address the problem of misalignment which can occur if metal chips or debris work themselves between a pallet and the bed of the milling machine on which the pallet sits. This is a significant problem, as an error of less than one mil can be sufficient to require scrapping of an entire batch of machined parts.

OBJECTS AND SUMMARY OF THE INVENTION

It is an object of this invention to provide a pallet changer device to be used in conjunction with a milling machine or other metal working machine, which removes, without an attending operator, pallets of finished workpieces from the machine and replaces them with pallets of fresh workpieces or workpieces still to be machined by the same process.

It is another object of the invention to provide the device with a programmable controller which automatically orchestrates the pallet changing and machining operation, and which can be signalled from a control panel to initiate the operation.

It is yet another object of this invention to provide the pallet changer as a compact, field-installable device which is universal, i.e., can be used with almost all milling machines or machining centers and can be installed so as to load pallets from the side of the milling machine or machining center.

It is a still further object of this invention to provide the pallet changer with an upwards biasing cam locking system which holds the pallets in place in such a way that machining debris and metal chips will not interfere with the accurate registration of the pallet and workpieces.

It is yet a further object of this invention to provide a pallet changer in which a wash cycle is automatically carried out and in which the pallet with the washed, machined parts is returned to a position where an operator can remove the machined parts from the pallet and replace them with fresh workpieces and after which he or she can initiate the cycle anew.

It is another object of this invention to increase machine tool utilization time by reducing the machine down time for loading, keeping the down time limited only to the small amount of time required for the pallet changing device to exchange a pallet of machined workpieces with a pallet of fresh, unmachined workpieces.

It is still another object of this invention to maximize the operator safety factor by permitting completely unattended operation of the machining center or milling machine, and eliminating any need for an operator at the spindle area of the machining center or milling machine during a machining operation.

A still further object of this invention is to provide a pallet changer device that will accommodate pallets of various configurations and sizes, so as to fit the user's needs, which accommodates either manual or automatic pallet loading, which integrates easily into a pallet pool line, and which reduces workpiece changeover time to a bare minimum.

In accordance with an aspect of this invention a universal field-installable pallet changing, loading, and cleaning apparatus automatically brings a pallet containing at least one workpiece to a work station, and precisely locates that workpiece in position for machining at an automatic machining device, and thereafter retrieves the machined workpiece and pallet, cleans it, and exchanges it with another. The pallet has an upper side that includes means for clamping or otherwise holding at least one workpiece to be machined. Its underside is provided with flanged rails that extend in a longitudinal direction. An indexing work station is disposed adjacent the machining device. This work station has rails which slidably receive the pallet rails, and stop means for locating the pallet accurately at a predetermined position with respect to the spindle or similar machining means of the machining device. At the work station, a cam biases the pallet upwards when the pallet is at the predetermined position. This locks the flanges of the pallet rails against flanges of the station rails. A loading and cleaning station has a housing in which there is mounted an invertable table that is journalled along its horizontal axis, and has a pair of opposed base plates on opposite sides of the axis. There are flanged longitudinal rails on each table base plate for slidably engaging the pallet rails and for permitting transfer to and from the work station. Cams are also provided on these table plates for biasing the pallets away from the plates so as to engage the flanges of the pallet rails with the rail flanges of the invertable table. A displacement arm engages a projection on the pallet and moves the same between the invertable table and the work station.

This positions the pallet containing fresh workpieces under the machining device, and then when the machining operation is complete, removes the pallet containing finished workpieces back to the invertable table of the loading and cleaning station. A drive mechanism rotates the table at the appropriate times, indexing it 180°, to invert the same when the pallet containing the workpieces is in place on it. A washing or cleaning device, e.g. a sprayer, within the housing washes debris from the inverted pallet and from any workpieces mounted on it.

Control means coordinate the operation of various parts of the system and actuate the work station and the loading and cleaning station so that the system operates generally in the following fashion. While the machining device is automatically machining workpieces on one pallet at the work station, an operator can be reloading another pallet which is available at the loading and cleaning station. The operator loads the workpieces onto preset fixtures, i.e. vises, clamps, etc., at positions appropriate for the particular machining process involved. After this pallet has been loaded, the operator presses a button on a control panel of the control means. This causes the pallet of unmachined parts and the invertable table that holds the pallet, to index 180°, and to hang "upside down" in the loading and cleaning station. This indexing operation causes a vacant station, i.e. on the opposite plate of the invertable table, to be positioned on top, awaiting the completion of the machining of workpieces on the pallet which is then at the work station, under the machining or milling center.

When the machining of parts is completed, the control means automatically condition the work station mechanism for removal of the pallet. The displacement arm, which can be a gear driven arm as in the preferred embodiment, moves forward from the pallet loading and cleaning station and grasps the pallet of finished machined workpieces. This arm then pulls the pallet back from the machining device work station and slides the same in place on the available side of the invertable table. The camming devices are actuated to lock the pallet in place. Then the invertable table is indexed 180°. This presents a pallet that is loaded with fresh, unmachined workpieces in an upward position. The gear driven arm, or other displacement mechanism, is then automatically actuated to shuttle the pallet of fresh workpieces onto the work station of the machining device table.

At the same time, as soon as the invertable table has been indexed, a wash cycle is commenced to remove metal chips or other machine debris from the inverted pallet and the finished parts that are carried on it. This wash cycle can be carried out by means of several spray arms that are carried on a trolley. The trolley with spray arms traverses beneath the suspended pallet inside the housing of the loading and cleaning station. After a number of wash cycles, a valve is appropriately actuated to apply compressed air to the spray arms so as to blow dry the pallet and parts. The number of wash cycles and blow dry cycles can be programmed to clean the parts within a reasonable cycle time.

At the completion of the washing and drying operation, the table is once again indexed 180° to bring the pallet and the cleaned, finished parts to an upward position. At this time, the operator can remove the machined articles and replace them with fresh unmachined workpieces, at which time the cycle is again initiated.

The camming mechanism wedges the pallets upwards so that horizontal flanges of the rails inter-engage with each other. Thus, any machining debris is kept away from the mating surfaces of the rail flanges. This eliminates a major cause of machining error, and automatic placement of the pallets and their workpieces can be accurately and repeatedly carried out. This eliminates a major reason for out-of-tolerance machining. On the top of the loading and cleaning station, there are a pair of hinged cover flaps that extend from the sides of the housing to the edges of the pallet carried on the invertable table. These can be elevated open to provide clearance when a table indexing operation is to take place, but lowered to close at other times. These cover flaps prevent an operator from placing his or her hand into the machine during a cycle, and also prevent operator tools, such as screwdrivers, allen wrenches, or the like, from falling from the pallet or table into the machine. The covers also serve to keep the sprayed cleaning fluid from escaping out from the top of the loading and cleaning station.

The above and many other objects, features, and advantages of this invention will be more fully understood from the ensuing detailed description of a preferred embodiment, which is to be considered in connection with the accompanying drawing.

DETAILED DESCRIPTION OF A PREFERRED EMBODIMENT

Figure 1:
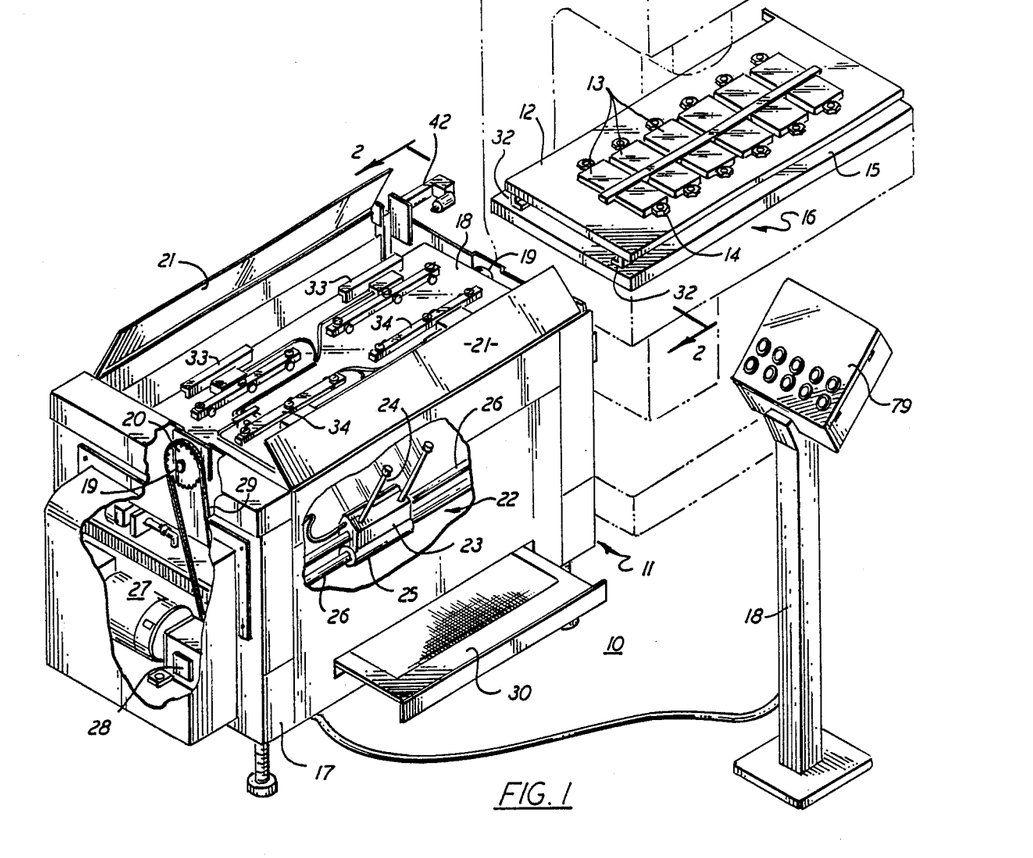
FIG. 1 is a perspective view of the pallet changing, loading and cleaning apparatus according to a preferred embodiment of this invention.

With reference to the drawing, FIG. 1 shows the general layout of a universal, field installable pallet changing system 10. Generally, the system comprises a floor-mounted pallet changing, loading and cleaning station 11 which automatically feeds and receives pallets 12 on which workpieces 13 are secured by hold down clamps or vises 14. The pallet is automatically transferred between the pallet changing station 11 and the bed or table 15 of a machine tooling device 16, here a vertical milling center. As further explained with reference to FIGS. 2 and 3, the pallet changing station 11 has a housing 17 and a table 18 (FIGS. 6 and 7) which is journalled for 180° rotation along a longitudinal axis 19 thereof. To this end, a drive sprocket 20 is affixed on the axis 19 at the side away from the milling center 16. Cover flaps 21 are hinged to side edges of the housing 17 and extend inwards, at least to the location of edges of the pallet 12. These are lifted for clearance to permit 180° indexing of the table 18. A washer mechanism 22 is disposed within the housing 17 and beneath the table 18. This mechanism 22 includes a trolley 23 that has a number of spray arms 24 mounted on it, and a hydraulic motor 25 which moves the trolley 23 longitudinally back and forth along rods 26 within the housing 17. A motor 27 and transmission 28 apply drive forces to a drive chain 29 to rotate the sprocket 20, and with it the table 18.

A debris collection drawer 30 slides in and out of the housing 17 beneath the washing mechanism 22. This contains a screen to remove machining debris and chips of metal from the oil or cleaning fluid that is sprayed by the arms 24.

Figure 2:
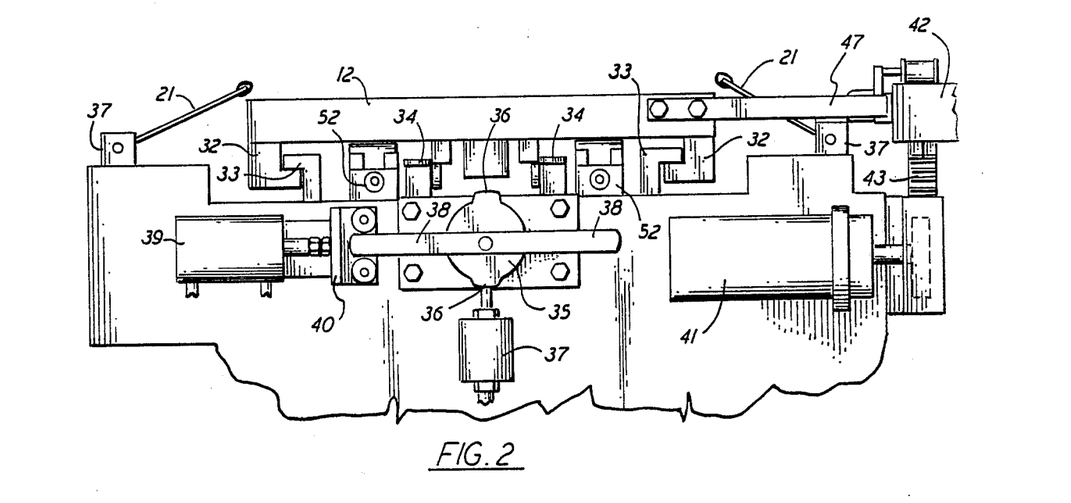
FIG. 2 is a partial sectional elevation taken along lines 2—2 of FIG. 1.
Figure 3:
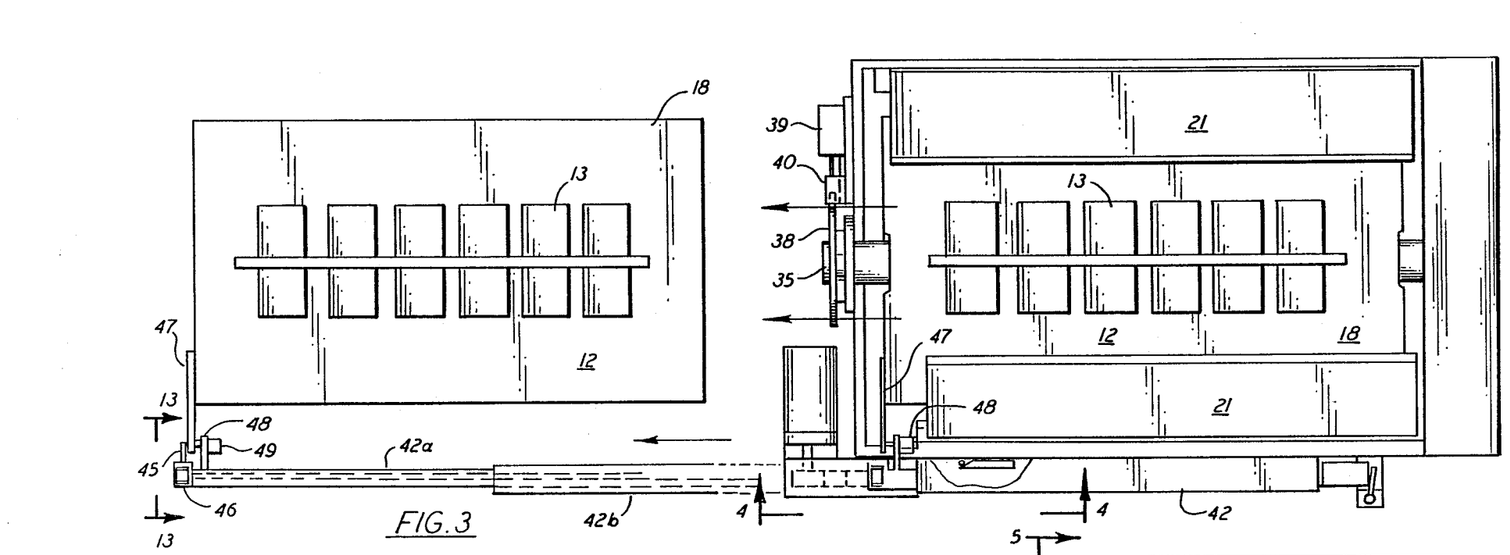
FIG. 3 is a plan view of the pallet changer and a schematic view of the extended arm showing the pallet being moved to the work station at the machine table.

The pallet 12, as shown in cross section in FIG. 2, on its lower side 31 has a pair of L-shaped flange rails 32, while the table 18 has on an upper plate 18a thereof, a set of mating L-shaped flange rails 33. The table also comprises a sufficient number of longitudinal guide assemblies 34, with both vertical and horizontal rollers, to guide the pallet 12 into position on the table 18.

An indexing device, as shown in FIG. 2, comprises a cam wheel 35 mounted on the table axis 19 at the distal end of the table 18, that is, that the end facing the milling center 16. This cam wheel 35 has cams 36 disposed at 180° spacing, which actuates a cam follower micro switch 37. The cam wheel 35 also carries a pair or radially extending lugs 38. A ram actuator 39 moves a key member 40 laterally to lock onto an associated one of the lugs 38 to hold the table 18 against rotation when not desired.

Figure 4:
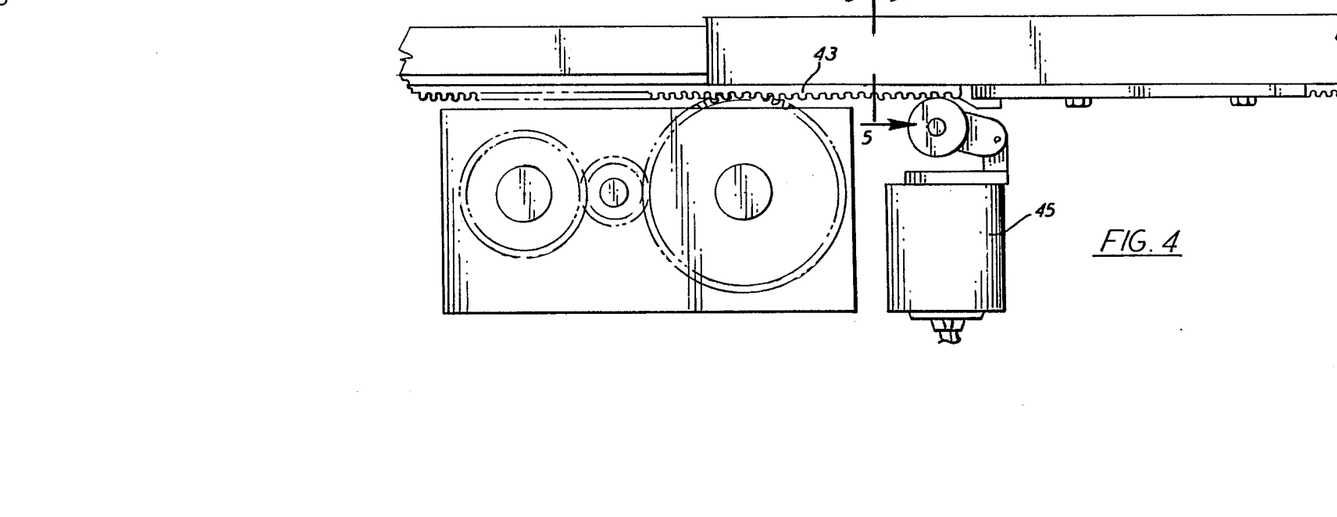
FIG. 4 is a partial side elevation taken along line 4—4 of FIG. 3.

Also shown in FIG. 2 is a motor 41 for powering an express arm 42 which is slidably mounted alongside the housing 17 of the pallet changing and cleaning station 11. This arm 42 is comprised of inner and outer sleeves 42a, 42b, which carry a toothed rack 43 driven by a pinion gear 44 (See FIG. 4) that is driven by the motor 41. A microswitch 45 senses the presence of the end of the rack 43.

Figure 5:
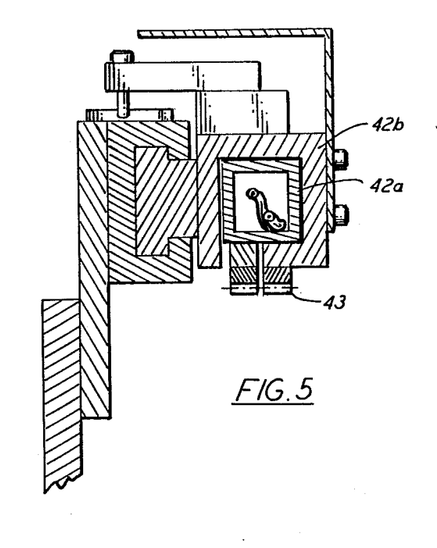
FIG. 5 is a sectional elevation taken along line 5—5 of FIG. 4.
Figure 13:
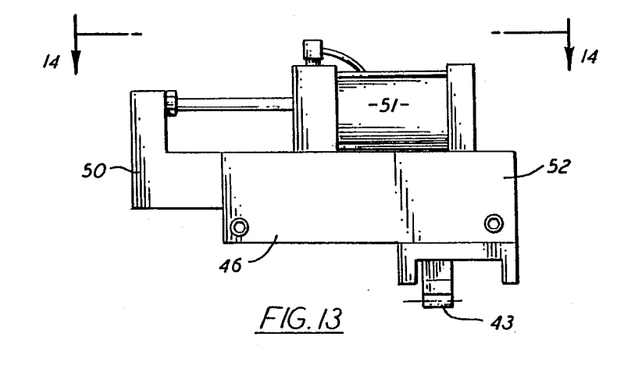
FIGS. 13 and 14 are an end elevation and a detailed partial plan view of the extender arm of this embodiment.
Figure 14:
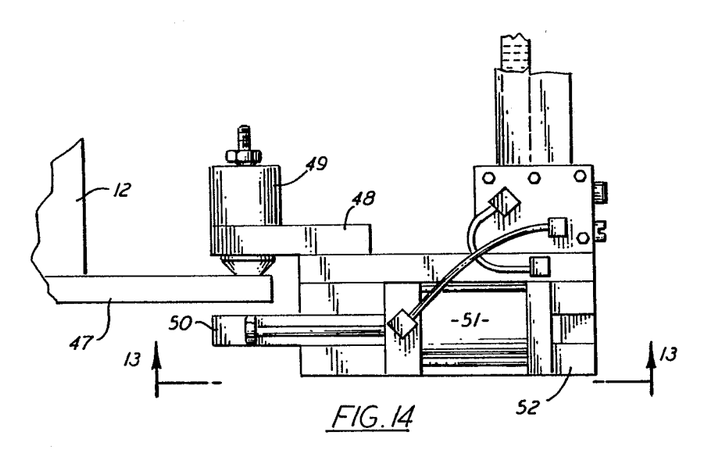

A finger mechanism 46 is disposed at the distal end of the express arm 42 (as shown in FIGS. 5, 13, and 14). The finger mechanism couples with a pallet arm 47 that is affixed onto the pallet 12, and protrudes laterally a sufficient distance to contact the finger mechanism 46. The latter comprises a fixed finger 48 which carries a rubber bumper 49 that pushes against the pallet arm 47, and a movable finger 50, which can be selectively moved for pulling against the front or distal side of the pallet arm 47 to remove the pallet back onto the table 18 of the station 11. The above members are mounted in a frame 52 for the finger mechanism 46.

Figures 6, 7:
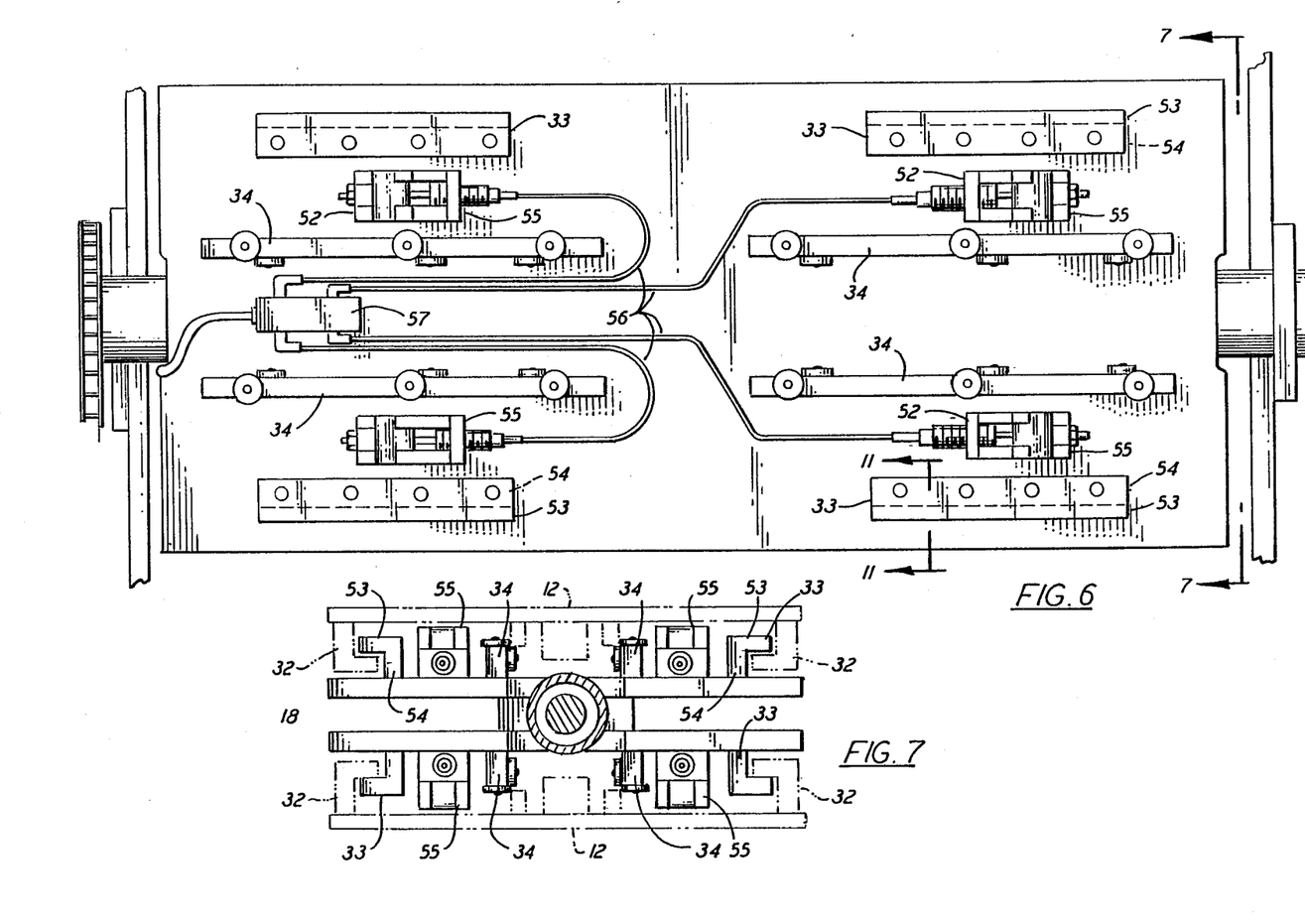
FIG. 6 is a plan view of the invertable table of the loading and cleaning station.
FIG. 7 is an end elevation taken along lines 7—7 of FIG. 6.

As shown more specifically in FIGS. 6 and 7, the table 18 is formed of an upper plate 18a and lower plate 18b, which are substantially identical. The plates 18a and 18b carry the L-shaped rails 33 as illustrated, with a horizontal flange 53 disposed away from the surface of the plate 18a, 18b, and a vertical web 54 joining the flange 53 to the plate 18a, 18b.

Figure 8:
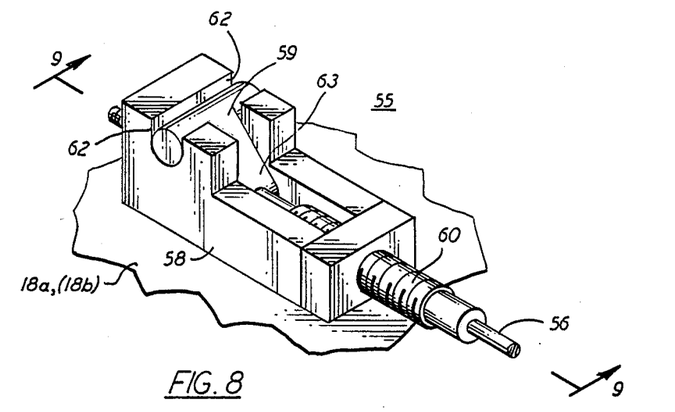
FIG. 8 is a perspective view of the cam locking arrangement employed with this invention.
Figure 9:
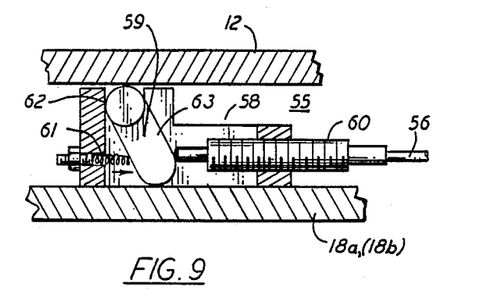
FIGS. 9 and 10 are sectional views, along lines 9—9 of FIG. 8 showing the wedging action of the camming device against the pallet.
Figure 10:
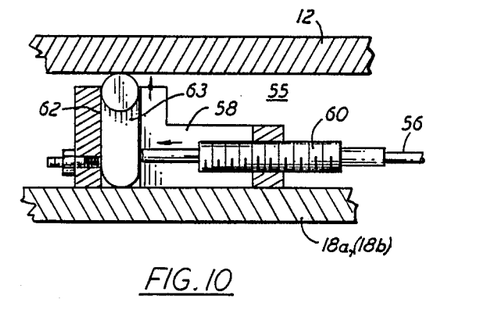

Also shown in FIGS. 6 and 7, each table plate 18a, 18b has several camming lock devices 55 which are hydraulically actuated and are connected by hydraulic lines or conduits 56 to a union connector 57. As shown in FIGS. 8–10, each camming device 58 is formed of a shoe or block 58 affixed onto the surface 18a, 18b, with a T-shaped camming member 59 contained therein. A hydraulic ram 60 is mounted in one end of the shoe 58, with the T-shaped camming member being mounted opposite it. Alternatively, the ram 55 could be a pneumatic cylinder or a solenoid. A return compression spring 61 is mounted in an end wall of the shoe 58 for urging the camming member 59 towards the ram 60.

Figure 11:
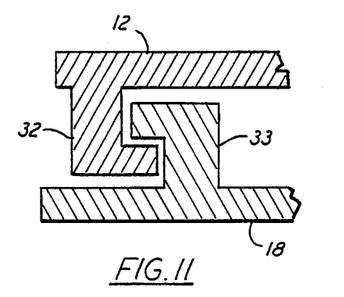
FIGS. 11 and 12 show the interaction of the pallet rails and table rails in unlocked and locked positions, respectively.
Figure 12:
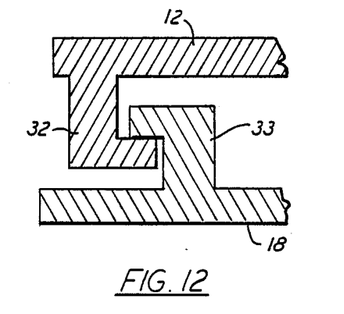
Figures 15, 16:
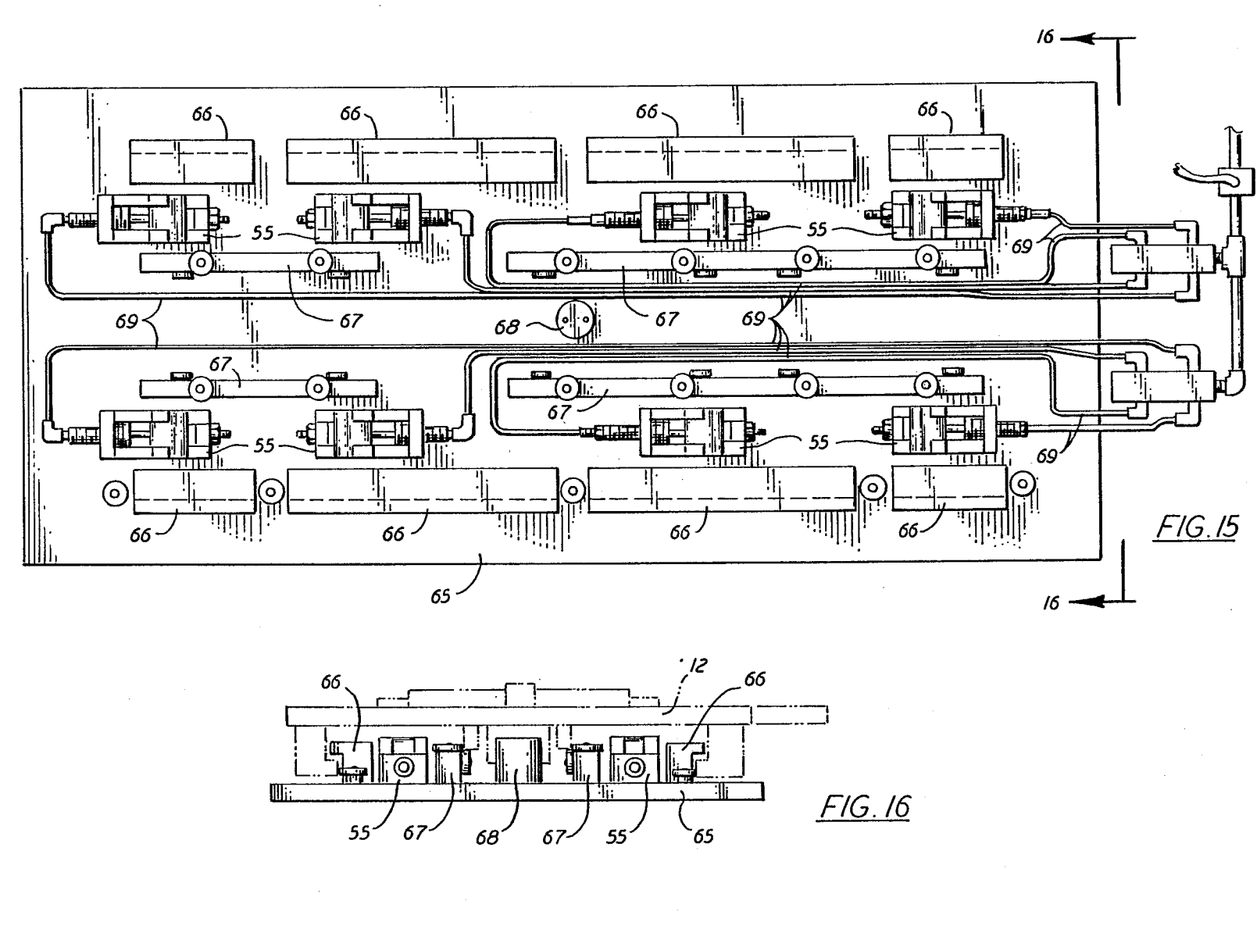
FIG. 15 is a plan view of the work station indexing unit employed at the machine table.
FIG. 16 is end view of the indexing unit taken along lines 16—16 of FIG. 15.

Cross bars of the T-shaped camming member 59 ride in vertical slots 62 of the shoe 58, while a tongue 63 of the camming member rides along the surface of the associated plate 18a, 18b. When the hydraulic pressure is relieved from the lines 56, the ram 36 is relaxed and the spring 61 urges the member 59 into its recumbent position as shown in FIG. 9. In this condition, the pallet 12 can be slid onto the rails 33 with clearance between the flanges of the rails 32 and 33, as shown in FIG. 11. Thereafter, hydraulic pressure in the lines 56 causes the rams 60 to urge the members 59 to an erect position, as shown in FIG. 10. This raises the pallet 12 away from the table plate 18, and brings the flanges of the respective rails 32 and 33 into contact. Because of the upward locking condition, debris or machining chips are highly unlikely to fall onto the mating surfaces of these flanges, so that it is extremely unlikely that any machining debris would cause errors in alignment of the pallet and the associated workpieces 13. FIGS. 15 and 16 illustrate the arrangement of a so-called indexing unit 65 which is disposed on the table or bed 15 of the milling center 16. The arrangement of this indexing unit 65 is quite similar to that of the table plates 18a, 18b, and comprises L-cross-section rails 66 as well as guide rail and wheel assemblies 67. A locator post 68 is situated on the indexing unit 65 for accurately positioning the pallet 12 at the work station. A plurality of hydraulic lines 69 are each associated with camming devices 55. These devices 55 are identical with those discussed with reference to FIGS. 8–12, and serve the same purpose, namely urging the pallet upwards for accurately positioning the pallet 12 and workpieces 33, and locking the flanges of the pallet rails 32 against flanges of the indexing unit rails 66.

Figure 17:
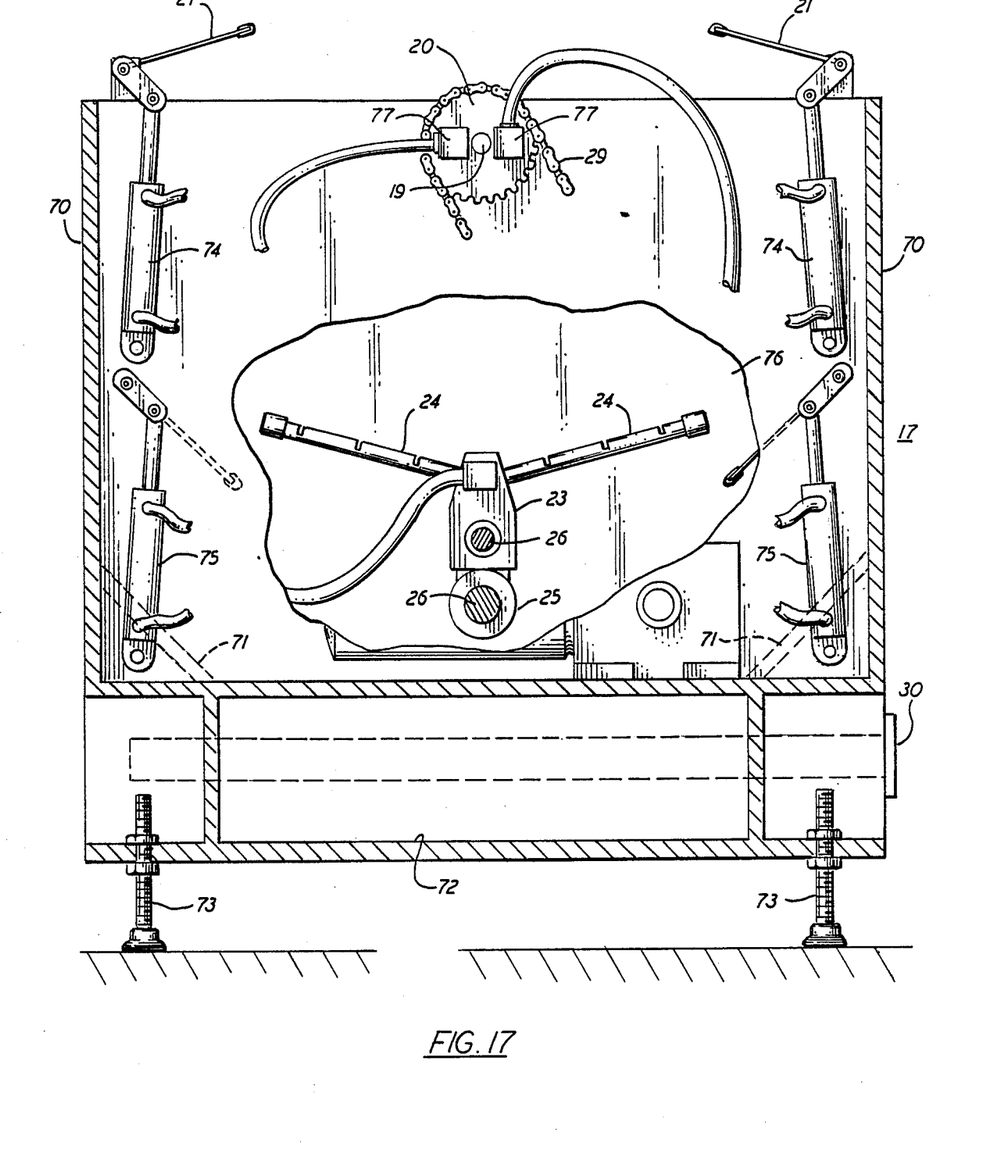
FIG. 17 is a sectional, partly cut away end elevation of the loading and cleaning station, showing the cover flap opening mechanism and the spraying mechanism thereof, and taken along lines 17—17 of FIG. 3.

With reference to FIG. 17, and also to FIG. 1 and FIG. 2, the housing 17 for the pallet changing, loading and cleaning station 11 has the covers 21 hingedly mounted at the top of side walls 70, and diagonal walls 71 beneath the washer mechanism 22 extend to a cleaning solvent or fluid well 72 at the bottom of the station 11. Leveling screws 73 are disposed at each corner of the base of the station 11 for leveling the same and placing the table 18 at the appropriate height with respect to the indexing unit 65 at the work station 15.

As shown in FIG. 17, a pair of hydraulic pistons 74 and associated linkages serve to lift the cover flaps 21 at the appropriate times for rotating the table 18, and a pair of hydraulic pistons 75 serve to lift a frame 76 on which the wash mechanism 22 is suspended. This brings the spray arms 24 upwards during a wash and blow dry cycle. Hydraulic connectors 77 feed hydraulic fluid through the sprocket 20 to each of the unions 57 so that the appropriate group of the cam devices 55 can be actuated or relaxed as appropriate. Also, as shown in FIG. 1, a controller 78 includes an operating console 79. This controller 78 is programmable to adjust the wash and blow dry cycles to allow the washing to occupy the maximum amount of time available, taking into consideration the amount of time required for a machining cycle on the machine center 16, and the amount of operator time required for removing the finished workpieces 13 from the pallet 12 and installing new workpieces thereon.

The station 11 can be positioned between machine centers 16 on a pallet line for washing and holding the pallets and parts between successive machine steps. Also, the station 11 can be used in connection with a pallet distribution and storage station, which stores a large number of preloaded pallets and then supplies them one at a time, to the pallet changing and cleaning station 11. The latter automatically feeds the pallets that carry unfinished workpieces 13 to the milling center 16. The pallet 12 carrying finished machined parts 13 is then returned to the pallet changing and cleaning station 11, and the finished parts are cleaned therein. Then the pallet with the clean, finished parts can be returned to an appropriate location in the automatic distribution and storage station.

It should be emphasized that the system of this invention reduces workpiece change-over time to an absolute minimum, and permits loading and unloading of workpieces simultaneously with the ongoing machine cycle. Pallet line integration is facilitated because of the location of the pallet changing and cleaning station at the side, rather than in front, of the milling center or other machining mechanisms 16. This system can be readily field retrofitted onto virtually any existing milling or machining center, and can be integrated easily into a pallet pool line or into a flexible machining system. Because of the upward camming movement of the camming devices 55, metal flakes, chips, and grindings do not present any problem for the accurate and repeatable positioning of pallets at the work station. With this system operator intervention is kept to a minimum, and completely unattended operation is possible. Pallets 12 of various dimensions, as appropriate to the machining operation or operations to be performed. The pallets 12 need not be strictly flat pallets, but T-slotted pallets, sub-plate type pallets, and other pallets, as required for the machining of particular parts, can readily be employed.

The automated feed cycle for the system 10 is generally as follows. In operation, there is a pallet 12 with workpieces 13 mounted on it at the work indexing unit 65 at the machining work station. When the machining work is finished, this pallet 12 is returned by the displacement arm 42 to the invertable table 18. To accommodate this, the covers 21 are first lifted. The cam mechanisms 55 are actuated to hold the pallet 12 in place on the table 18, and then the table 18 is inverted 180° so that the pallet and the machined workpieces 13 thereon face the washer mechanism 22. At that time another pallet 12 containing fresh workpieces 13 is moved from the other side of the table 18, which is now disposed upwards to the indexing mechanism 65. Then the express arm releases itself from the second pallet 12 and returns to a standby position. The cover flaps 21 are lowered, and the washer mechanism 22 begins its spray washing of the inverted pallet 12 and the finished workpieces 13. After a sufficient number of cycles of washing and blow drying, the cover flaps 21 are raised and the table 18 is then inverted, bringing the pallet 12 with the finished workpieces 13 back to the top. At this time, the covers are dropped back to the closed position, and an operator can simply remove the finished parts from the pallet by releasing the vises 14, and can install fresh workpieces to be machined back onto the top of the pallet 12. When the machining cycle is finished, this newly ready pallet of workpieces is inverted on the table 18, and the pallet changing and cleaning station is ready to receive the finished parts and exchange them with other unfinished workpieces. Because all of this takes place in only a few seconds, the machining or milling center can be utilized on a work cycle that is close to 100%, which is substantially double the effective work cycle using a manual loading system.

While the invention has been described in detail with respect to a preferred embodiment, it should be understood that the invention in not limited to that embodiment, and that many modifications and variations could be effected without departing from the scope and spirit of this invention, as defined in the appended claims.

What is claimed is:

1. Universal, field installable pallet changing, loading and cleaning apparatus for automatically bringing and precisely locating a workpiece in position at an automatic machining device and thereafter retrieving the machined workpiece, cleaning it and exchanging it with another, comprising:

at least one flat pallet having an upper side with means for holding at least one workpiece and an underside with rails that extend in a longitudinal direction thereon;

a work station disposed adjacent said machining device and including rail means for slidably receiving said pallet rails, stop means for locating said pallet accurately at a predetermined position, and cam means biasing said pallet upwards when said pallet is at said predetermined position to lock said rails against said rail means; and a loading and cleaning station including a housing, an invertable table journalled on a horizontal axis and having opposite sides, rail means on at least one side of said table for slidably engaging said at least one pallet to permit transfer to and from said work station, cam means selectively biasing said pallet away from said table to engage said rails and the rail means of said table when the pallet is disposed on said table; displacement means for engaging said pallet and moving the same between said table and said work station, means for rotating said table about said horizontal axis with said pallet thereon to invert the same, washing means within the housing for washing debris from the inverted pallet and any workpiece mounted thereon, and control means for controllably actuating said work station and said loading and cleaning station so that in operation said pallet with said workpiece mounted thereon is moved to said work station to commence a machining operation, when said machining operation is complete said pallet is returned by said displacement means to said table and the cam means thereof is actuated to hold said pallet, said table is inverted 180° so that said pallet and the machined workpiece thereon faces said washing means whereupon the latter is actuated to perform a wash cycle, and said table is again inverted to return the pallet and the cleaned workpiece to an upward position so that the machined and cleaned workpiece can be removed from said pallet and replaced with a fresh workpiece.

2. The apparatus of claim 1 wherein said table has substantially identical rail means and cam means disposed on each of said sides thereof so that similar pallets can be held on each of said sides.

3. The apparatus of claim 1 in which said pallet rails and said rail means have horizontal flanges thereon which interengage with each other.

4. The apparatus of claim 1 in which said cam means include a block mounted on one of said table and said work station, a wedging member which slides in said block between a recumbent position and an erect position, ram means for urging said wedging member to said erect position, and resilient means urging said wedging member to said recumbent position.

5. The apparatus of claim 4 wherein said wedging member is a T-shaped member having a tongue which depends from a pair of horizontal cross arms, and said block is in the form of a shoe having a pair of grooves permitting vertical movement of said cross arms therein and a surface on which an end of said tongue slides.

6. The apparatus of claim 1 wherein said housing comprises a pair of covers swingably mounted at opposite side walls of said housing and extending to respective side edges of said table, and means for automatically lifting said covers during the rotation of said table.

7. The apparatus of claim 1 wherein said means for rotating said table includes a locking member mounted on the axis of said table and having a pair of lugs disposed 180° apart, a keeper mounted on said housing and which selectively engages and releases one of said lugs when said table is oriented in one of two predetermined positions, and ram means selectively moving said keeper into engagement with the appropriate one of said legs.

8. The apparatus of claim 1 wherein said washing means includes at least one spray arm and trolley means carrying said at least one spray arm and moving the same longitudinally beneath said table when said pallet containing the machined workpiece is carried on the table and is inverted so as to face the washing means.

9. The apparatus of claim 8 wherein said washing means further includes means for initially supplying a cleaning fluid bath to said spray arm and thereafter supplying compressed air thereto for cleaning the workpiece of debris with a wash spray and then with air.

10. The apparatus of claim 8 wherein there are a plurality of said spray arms and the trolley means for moving the same includes a trolley on which said arms are positioned and a plurality of horizontal rods in said housing on which said trolley oscillates.

11. The apparatus of claim 1 wherein said means for moving said pallet includes an arm slidably mounted on said housing and having a toothed rack mounted on it, a drive gear engaging said rack for driving said arm, a motor for turning said drive gear; and a movable finger at a distal end of said arm and movable laterally into engagement with said pallet for selectively engaging said pallet.

* * * * *